Patented Aug. 28, 1923.

1,466,353

UNITED STATES PATENT OFFICE.

CLINTON E. DOLBEAR, OF SAN FRANCISCO, CALIFORNIA, ASSIGNOR TO INDUSTRIAL RESEARCH CO., OF SAN FRANCISCO, CALIFORNIA, A BUSINESS ASSOCIATION.

RECOVERING ALKALI-METAL SALTS FROM BRINES.

No Drawing.   Application filed January 22, 1923. Serial No. 614,291.

*To all whom it may concern:*

Be it known that I, CLINTON E. DOLBEAR, a citizen of the United States, residing at the city and county of San Francisco and State of California, have invented certain new and useful Improvements in Recovering Alkali-Metal Salts from Brines, of which the following is a specification.

My invention relates to the treatment of brines carrying alkali metal salts, particularly a mixture of potassium and sodium salts. Its object is to recover said salts by a simple and effective method of precipitation, and to this end my invention consists in the novel method which I shall now fully describe.

The principle involved in my method is based upon the fact that certain salts of potassium and sodium are almost insoluble in ammonical solution. I have found that if ammonia is rapidly dissolved in such brine as occurs at Searles Borax Lake or Deep Springs Valley in California, sodium sulfate chiefly is first precipitated. As the solution becomes stronger with ammonia, sodium carbonate and borax, together with practically all the remaining sodium sulfate are precipitated, leaving potassium and sodium chloride alone in solution.

If, now, sodium sulfate in solution is added to the last brine, that is, the strong ammoniacal brine containing the potassium and sodium chlorides, the potassium chloride reacts with the added sodium sulfate, forming potassium sulfate which immediately precipitates from the brine.

In practice, I find that the sodium carbonate, sulfate and borate are very completely precipitated during the addition of the ammonia in the first step of the method as above described, and that the potassium in the form of sulfate is quite completely precipitated by the addition of sodium sulfate in the second step.

In carrying out the method, it is advantageous to initially recover a portion of the contained sodium sulfate from the raw brine, prior to adding the ammonia, by lowering the temperature of the brine, thus causing the sodium sulfate to, in part, crystallize out as a hydrated sodium sulfate. This has a three fold economic value, in that, first, the sodium sulfate required for the formation and precipitation of the potassium sulfate in the second step of the method is thus obtained; second, the salts remaining in the brine are in greater concentration; and, third, a large part of the comparatively less valuable sodium sulfate is eliminated from the salts recovered.

In practising my method therefore, I first chill the raw brine to near the freezing point of water. This causes hydrous sodium sulfate to crystallize from the brine. I then separate this sodium sulfate from the brine for use in the second step of the method. Then I rapidly pass ammonia gas into the brine until the brine has absorbed approximately 32% of its weight of ammonia. This tends to heat the brine considerably, but the temperature is kept down by appropriate means, and as a result there is precipitation of sodium carbonate, sulfate and borate.

From this point on, the procedure depends upon whether or not it is desired to produce a salt containing all the recovered salts, or one salt containing sodium carbonate, sodium sulfate and borax, and a second salt containing nearly pure potassium sulfate.

If the first mentioned object, namely the recovery of a salt containing all the salts, be the result desired, the method is continued as follows:—After dissolving in water the sodium sulfate initially recovered by chilling the brine, this solution is added to the ammoniacal brine. Potassium sulfate is formed and immediately precipitates. Then all the precipitated salts are separated together from the supernatant ammoniacal brine and subsequently refined to separate them from each other.

If the second mentioned object, namely the recovery as one product comprising a mixture of sodium carbonate, sulfate and borax, and another product consisting of potassium sulfate, be the result desired, I separate from the supernatant liquor the first precipitated salts, to wit, the sodium carbonate, sulfate and borax, before adding to the brine the sodium sulfate solution for the second step. Then this solution is added to the brine, with the result that a precipitate rich in potassium sulfate is formed and finally the mixture of the first precipitated salts is suitably separated into its component parts. The ammoniacal brine is then subjected to distillation to recover the ammonia for further use.

Concerning the feature of my method which involves the relatively rapid charging of the brine with ammonia in the first step, it should be noted as follows. Were the ammonia slowly dissolved, an increasingly larger proportion of the potassium salt would be precipitated with the sodium salts. The potassium precipitates as a sulfate as above explained. In these brines sodium sulfate is always present in considerable quantity. It is evident that the potassium chloride, the form in which it is present in the brine, reacts with the sodium sulfate, forming potassium sulfate and sodium chloride. But this reaction is slow; wherefore, if the ammonia is added rapidly the sodium sulfate, which is decreasingly soluble in increasingly strong ammonia solution, is precipitated before any appreciable amount of it has reacted with the potassium chloride. Consequently, the potassium is retained in solution as the chloride, which is decidedly soluble in ammoniacal solution.

In practice, therefore, I find that the more quickly the brine is charged to a high percentage with ammonia, the less potassium is deposited. I find that if the brine is charged with ammonia in half an hour or less, the salts precipitated contain only a very small amount of potassium, while if the time taken to charge the brine with ammonia is two hours or more, especially if agitated during charging, a large amount of the potassium present is deposited.

In other words the ammonia charging should be carried out as quickly as mechanically convenient in order to retain the greatest quantity of potassium in solution.

Concerning the use of sodium sulfate in the second step of my method, I wish it to be understood that other chemical equivalents may be used. I have mentioned sodium sulfate since it is the most convenient sulfate to be used in conjunction with these brines, as it can be obtained from the brine itself as I have explained, and for the further reason that it is everywhere a cheap material to use. Many equivalents, however, may be used; practically any soluble sulfate, such for instance as ammonium sulfate, magnesium sulfate, iron sulfate and even calcium sulfate. Therefore, in my claims hereto appended, it must be understood that my expression of sodium sulfate includes as its chemical equivalent other soluble sulfates.

I claim:—

1. The method of recovering salts from brine containing a mixture of sodium and potassium salts, which comprises adding to the brine ammonia, and an aqueous solution of sodium sulfate.

2. The method of recovering salts from brine containing a mixture of sodium and potassium salts, which comprises first, adding to the brine ammonia to precipitate the sodium salts and then adding to the ammoniacal brine an aqueous solution of sodium sulfate to precipitate a potassium salt.

3. The method of recovering salts from brine containing a mixture of sodium carbonate, sulfate, and borate, and potassium chloride, comprising the precipitation of the sodium carbonate, sulfate and borate by the addition to the brine of ammonia, and the precipitation of the potassium as potassium sulfate by the addition to the ammoniacal brine of an aqueous solution of sodium sulfate.

4. The method of recovering salts from brine containing a mixture of sodium carbonate, sulfate, and borate, and potassium chloride, comprising, first, precipitating the sodium carbonate, sulfate and borate by the addition to the brine of ammonia, and then adding to the ammoniacal brine an aqueous solution of sodium sulfate to form in the brine and precipitate therefrom potassium sulfate.

5. The method of recovering salts from brine containing a mixture of sodium and potassium salts comprising initially separating from the raw brine, by cooling, a portion of the contained sodium sulfate; then adding to the brine ammonia to precipitate the sodium salts; and then adding to the ammoniacal brine an aqueous solution of the sodium sulfate initially separated from the raw brine, to precipitate a potassium salt.

6. The method of recovering salts from brine containing a mixture of sodium and potassium salts which comprises adding to the brine ammonia and an aqueous solution of a sulfate.

In testimony whereof I have signed my name to this specification.

CLINTON E. DOLBEAR.